(12) United States Patent
Billmers et al.

(10) Patent No.: US 7,355,768 B1
(45) Date of Patent: Apr. 8, 2008

(54) WAVELENGTH TUNABLE HOLOGRAPHIC FILTER WITH BROAD ACCEPTANCE ANGLE AND NARROW SPECTRAL BANDWIDTH

(76) Inventors: Richard I. Billmers, 4 Tanglewood Dr., Langhorne, PA (US) 19047; Elizabeth J. Billmers, 4 Tanglewood Dr., Langhorne, PA (US) 19047; Mary E. Ludwig, 7 Buttonbush Ct., Elkton, MD (US) 21921

( * ) Notice: Subject to any disclaimer, the term of this patent is extended or adjusted under 35 U.S.C. 154(b) by 284 days.

(21) Appl. No.: 11/197,796

(22) Filed: Aug. 5, 2005

Related U.S. Application Data

(60) Provisional application No. 60/601,538, filed on Aug. 14, 2004.

(51) Int. Cl.
*G02B 5/32* (2006.01)
(52) U.S. Cl. .......................... 359/15; 359/19
(58) Field of Classification Search ............... None
See application file for complete search history.

(56) References Cited

U.S. PATENT DOCUMENTS 6,069,987 A * 5/2000 Sasaki et al. ................. 385/24

OTHER PUBLICATIONS

R. Burzynski, J. F. Weibel, M. K. Casstevens, R. I. Billmers, E. J. Billmers, 'Holographic wavelength filters based on MEMPLEX Photopolymer', Proc. SPIE, vol. 4833, pp. 577-583, Jun. 1-6, 2002.*

R. I. Billmers, E. J. Billmers, R. Burzynski, J. F. Weibel, L. H. Heverly III, M. K. Casstevens, T. P. Curran, V. M. Contarino, 'Narrow-band holographic optical filter using thick efficient holographic gratings', Proc. SPIE, vol. 4659, pp. 156-164, Jan. 21-23, 2002.*

R. I. Billmers, E. J. Billmers, M. E. Ludwig, R. Burzynski, J. F. Weibel, M. K. Casstevens, 'Development of thick volume holographic gratings for narrowband spectral filter applications', IEEE Conference on Lasers and Electro-optics (IEEE CLEO), vol. 1, May 16-21, 2004.*

* cited by examiner

*Primary Examiner*—Arnel Lavarias
(74) *Attorney, Agent, or Firm*—Ted Masters

(57) ABSTRACT

A narrowband, tunable filter with a wide acceptance angle utilizes two holographic filter elements connected in series. The filter blocks light outside of a narrow spectral band of interest, while enabling light to be seen over a wide range of angles incident on the filter.

5 Claims, 2 Drawing Sheets

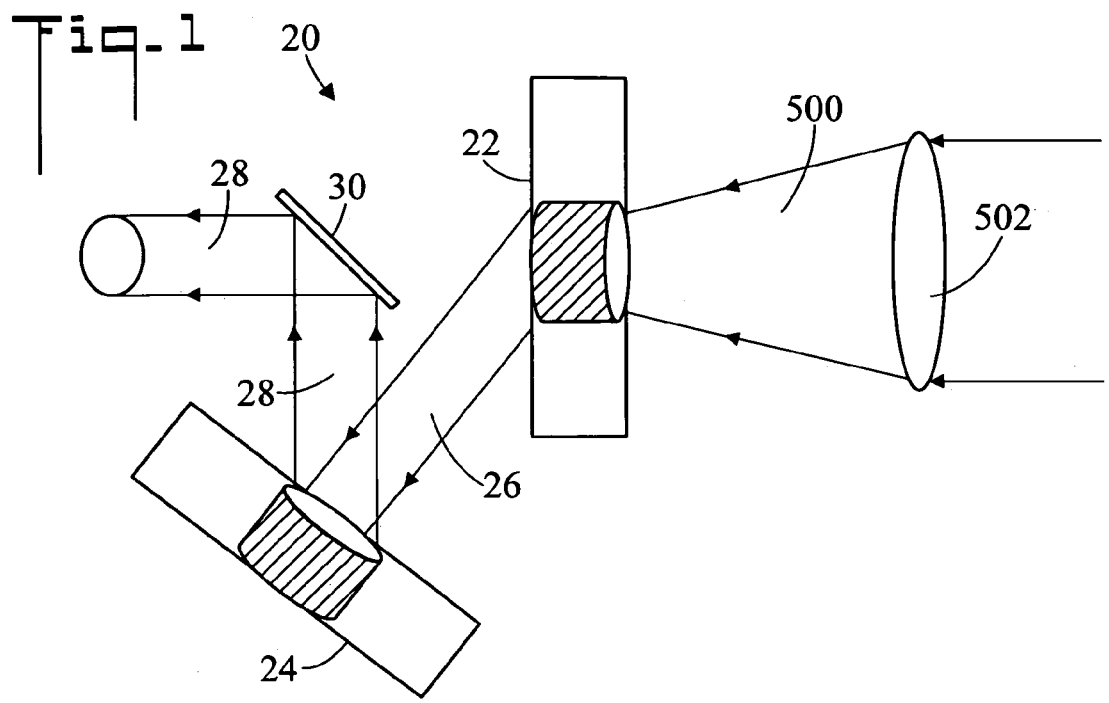
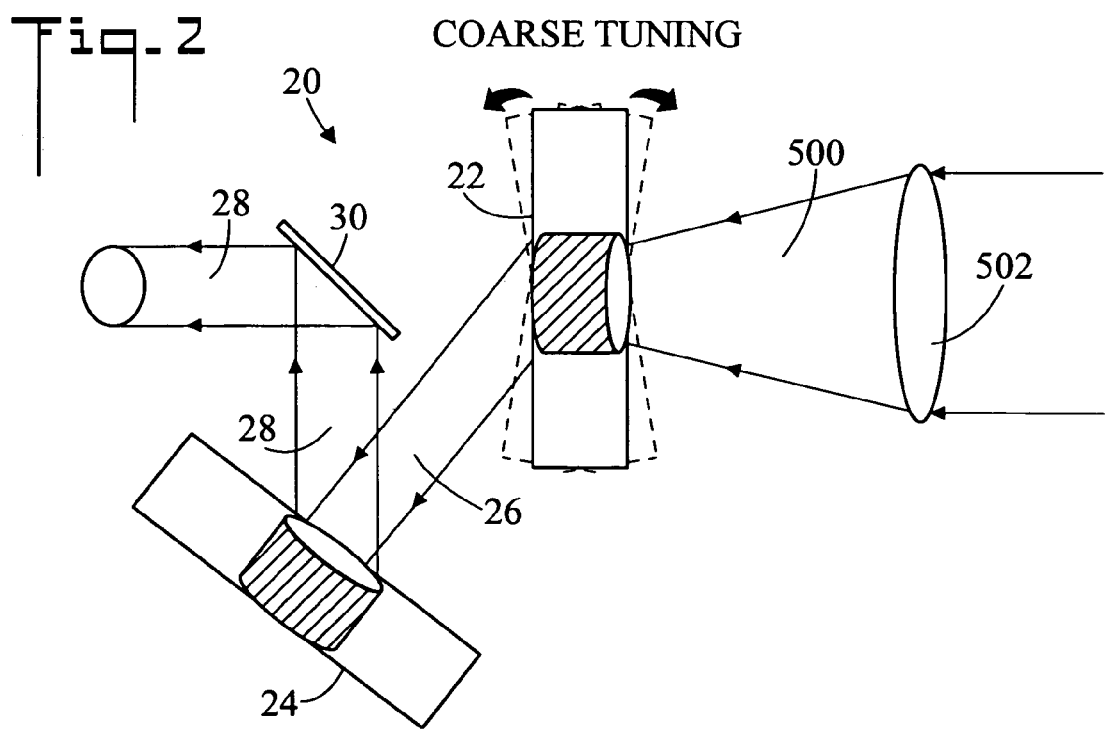

WAVELENGTH TUNABLE HOLOGRAPHIC FILTER WITH BROAD ACCEPTANCE ANGLE AND NARROW SPECTRAL BANDWIDTH

CROSS REFERENCE TO RELATED APPLICATION

This application claims the filing benefit under 35 U.S.C. § 119(e) of U.S. Provisional Application No. 60/601,538 filed Aug. 14, 2004, which is included herein by reference.

GOVERNMENT LICENSE RIGHTS

The U.S. Government has a paid-up license in this invention and the right in limited circumstances to require the patent owner to license others on reasonable terms as provided for by the terms of Contract No. N00014-03-C-0373, awarded by the Office of Naval Research (ONR).

TECHNICAL FIELD

The present invention pertains generally to light filters, and more particularly to a filter having two holographic elements. The filter blocks light outside of a narrow spectral band of interest, while enabling light to be seen over a wide range of angles incident on the filter.

BACKGROUND OF THE INVENTION

Prior art holographic filters have included multiplexed holographic grating arrays for improved field of view, but have used a spatial filter for transmission of the proper spectral band. This approach precludes the ability to tune the filter central wavelength. The present invention overcomes the difficulties of the prior art filters by blocking light outside of a narrow spectral band of interest, while enabling light to be seen over a wide range of angles incident on the filter.

BRIEF SUMMARY OF THE INVENTION

The present invention is directed to a narrow band, tunable filter with a wide acceptance angle which utilizes two holographic filter elements to enhance its, performance characteristics. The filter blocks light outside of a narrow spectral band of interest, while enabling light to be seen over a wide range of angles incident on the filter. The filter device can be inserted into any optical train such that light is incident on the first holographic element. Filtered light will be passed by the second element back into the optical train. The filter may be placed immediately before a detector, or before other optical or signal processing devices to provide filtered input to such devices.

The first element of the filter is a holographic element written to accept a wide range of incident angles. The first element can be written in several ways including, but not limited to, writing a large grating which accepts a broad range of incident angles or writing a series of multiplexed gratings at different angles designed to accept different and successive ranges of angles, thus enabling a wide total angular acceptance. The first filter element is written so that incoming light having different angles of incidence is passed collimated and directed at a second filter element which only passes light having a narrow spectral bandwidth.

Light of the desired narrow wavelength band is then passed by the second holographic filter element. The second element is written with a reflective geometry into a material of thicknesses up to 15 mm, thereby allowing the holographic grating in this element to have an extremely narrow (<1 Å) spectral bandpass. The first filter element is not required to have this narrow bandpass, because light outside of this spectral range which is passed by the first filter element will still be rejected by the second.

The properties of the volume holographic gratings allow the central wavelength accepted by the grating to be tuned by slightly adjusting the angle of the second filter element relative to the incident light. The filter element angle can be adjusted by means of, for example, precision rotation stages, piezo-electric devices, or any other method of achieving small motions about the filter's axis. At a different central wavelength the light accepted by the first filter element will be passed at a different angle than the original central band was, but the light passed will still be collimated. The second filter element can be tuned in a similar fashion to accept the new desired wavelength band. In this manner a single filter can be used for a broad array of applications without the need for a new device at a different acceptance wavelength. In addition, by providing the proper motion equipment and control programs, the filter of the present invention can be made rapidly tunable in the field for purposes of scanning selected wavelength ranges.

By decreasing filter bandpass, the filter of the present invention allows increased signal to noise ratios to be obtained. This technology allows increased detection sensitivity when searching for weak signals. The two element aspect of the filter doubles the blocking strength for out-of-band signals. The filter of the present invention can be used for applications at multiple wavelengths by tuning the holographic elements to different acceptance angles, or by writing holographic gratings in different materials or with different write configurations. The filter of the present invention can be used for applications at different spectral bandwidths by using holographic gratings written under different geometric configurations.

The first element contains a transmission holographic grating written with an object beam having a convergence angle equal to the desired acceptance angle range of the filter, and with a collimated reference beam. This geometry results in the first element accepting light within a wide angular range, but transmitting all filtered light as a collimated beam. The second element contains one reflection holographic grating written with an object beam the same as the reference beam of the first element. The reference beam of the second element is selected to provide a filtered reflection at any desired angle. This arrangement allows incident light from within a wide angular field of view to be transmitted by the grating contained in the first element as a well-collimated beam, which will be reflected by the second, narrow spectral bandwidth element.

In accordance with a preferred embodiment of the invention, a wavelength tunable holographic filter for incoming light having different angles of incidence, includes a first filter element which has a broad acceptance angle, and a second filter element which has a narrow spectral bandwidth. Incoming light having different angles of incidence is collimated by the first filter element and directed at the second filter element which only passes light having a narrow spectral bandwidth.

In accordance with an aspect of the invention, the first filter element is a transmission filter element.

In accordance with another aspect of the invention, the first filter element has an angle between write beams of between about 7.5 degrees and about 30 degrees.

In accordance with another aspect of the invention, the first filter element has a thickness of between about 0.75 mm and about 2 mm.

In accordance with another aspect of the invention, the second filter element is a reflection filter element.

In accordance with another aspect of the invention, the second filter element has an angle between write beams of between about 7.5 degrees and about 15 degrees.

In accordance with another aspect of the invention, the second filter element has a thickness of between about 5 mm and about 12 mm.

In accordance with another aspect of the invention, coarse tuning of the filter is accomplished by angularly positioning the first filter element.

In accordance with another aspect of the invention, fine tuning of the filter is accomplished by angularly positioning the second filter element over the wavelength band accepted by the first filter element.

In accordance with another aspect of the invention, a method for tuning a wavelength tunable holographic filter includes:

(a) providing a light source having different angles of incidence;

(b) providing a wavelength tunable holographic filter, including:

a first filter element having a broad acceptance angle;

a second filter element having narrow spectral bandwidth, wherein light from the first filter element is directed at the second filter element;

(c) directing light from the light source at the first filter element, wherein the light is collimated by the first filter element;

(d) angularly positioning the first filter element to accept a desired central acceptance wavelength having a wavelength band; and, (e) angularly positioning the second filter element to accept a wavelength within the wavelength band.

The method further including:

(f) effecting coarse tuning of the filter by angularly positioning the first filter element to accept a different central acceptance wavelength and wavelength band from that of step (d); and, repeating step (e).

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a functional diagram of a wavelength tunable holographic filter in accordance with the present invention;

FIG. 2 is a functional diagram showing a method of coarse tuning the filter;

DETAILED DESCRIPTION OF THE INVENTION

Figure 3:
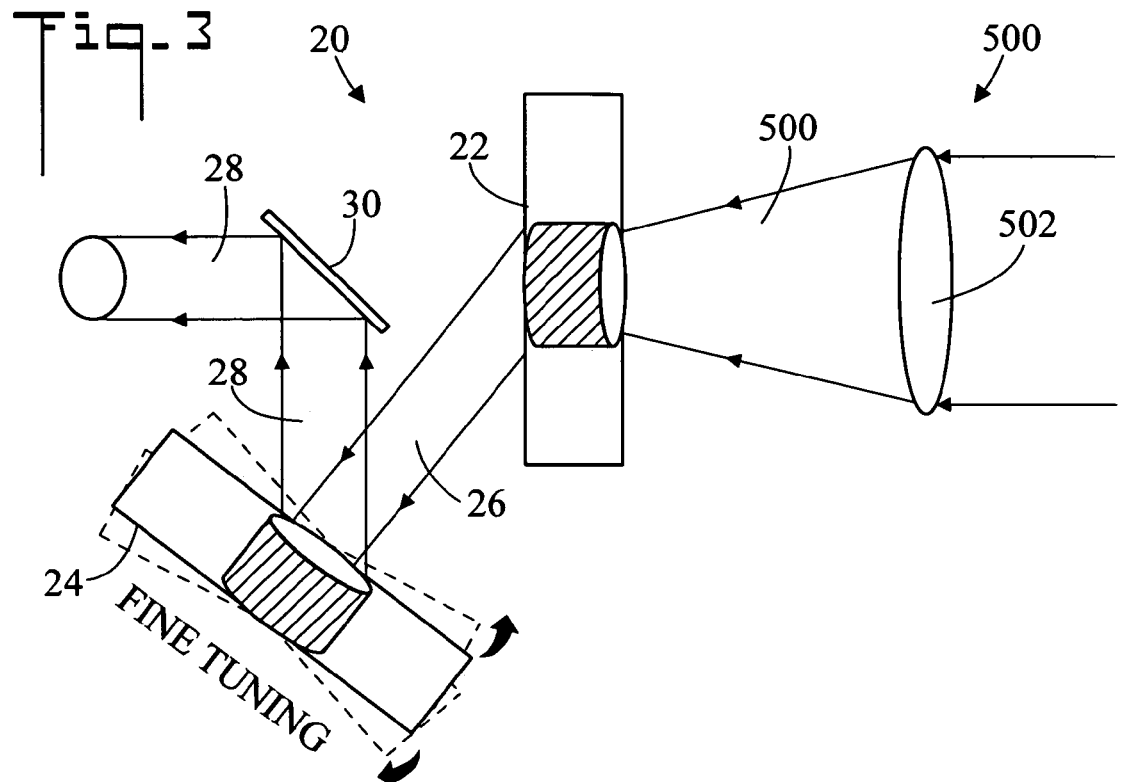
FIG. 3 is a functional diagram showing a method of fine tuning the filter.

Referring initially to FIG. 1, there is illustrated a functional diagram of a wavelength tunable holographic filter in accordance with the present invention, generally designated as 20. Filter 20 is designed to receive incoming light 500 having different angles of incidence, that is a "cone" of incidence angles. This means that filter 20 is optimized to accept incident light spanning a certain range of angles. If light were incident at any specific angle within this range, filter 20 would accept it, but it would not utilize the full aperture it was designed for. This concept differs from field of view, in that an angular field of view implies that any light source incident within that field will be equally accepted. To utilize the full design aperture of filter 20, incident light needs to span the entire range of angles accepted. An example of this arrangement is illustrated in FIG. 1, wherein light 500 is incident on filter 20 within a range of different angles created by the convergence of light through a lens 502. Such a lens 502 or other optical system does not constitute a part of the present invention, and filter 20 can be designed to accept such a range of angles created by many different types of lenses or optical systems.

Filter 20 includes a first filter element 22 having a broad acceptance angle, and a second filter element 24 having narrow spectral bandwidth. Light 500 having different angles of incidence is transformed by first filter element 22 into a collimated beam 26 and directed at second filter element 24 which only passes light 28 having a narrow spectral bandwidth. That is, by using two holographic grating elements in series, both broad acceptance angles and narrow spectral bandpass are achieved.

The first filter element 22, by virtue of its write geometry, will accept light from a wide range of angles and output light from these angles in a single well-collimated beam. By this arrangement second filter element 24 can have a narrow field of view without loss of information accepted by first filter element 22. First element 22 is not required to have a narrow spectral bandwidth, as light passed by this element outside the desired narrow band will be rejected by second filter element 24. Conversely, since second filter element 24 does not require a field of view, it can be written in a thick (up to 15 mm) optical storage material, including but not limited to photopolymers and photoreactive optical glass, allowing an extremely narrow spectral acceptance bandwidth (<0.5 Å).

In order to achieve a broad acceptance angle and output a collimated beam, first filter element 22 is written as an interference pattern between two beams with identical properties to those desired for reading, i.e. the writing is an interference between one collimated beam and one converging beam with angle of convergence equivalent to the desired acceptance angle of the final filter.

In an embodiment of the invention, first filter element 22 is a transmission (rather than reflection) filter element. This is because transmission elements have a broader spectral acceptance.

In another embodiment of the invention, second filter element 24 is a reflection filter element. The reflective geometry was selected because the required narrow line width could not be obtained using transmission gratings.

In the shown embodiment of the invention, filter 20 includes an optional mirror 30. Mirror 30 allows output light 28 of filter 20 to exit on the same path as incoming light 500.

Depending upon the specific application, an acceptable range of grating parameters for the present invention is:

First Filter Element 22

Write configuration: reflection or transmission

Material type: any photosensitive material into which a grating can be written, including but not limited to photo-sensitive glass, photopolymers, and crystals Material thickness: 0.75 to 2 mm Angle between write beams: 7.5 to 30 degrees Central Wavelength: ultraviolet to infrared Second Filter Element 24

Write configuration: reflection is much preferred to decrease spectral bandpass, although transmission could be used
Material type: same as for first filter element 22
Material thickness: 5 to 12 mm
Angle between write beams: 7.5 to 15 degrees
Central wavelength: ultraviolet to infrared In one embodiment of the invention, the following grating parameters were utilized:

First Filter Element 22
Write configuration: transmission—allows broad acceptance and therefore no tuning necessary
Material type: a photo-reactive polymer, sandwiched between indexed matched glass 'windows'
Material thickness: 1.1 mm
Angle between write beams: 30 degrees—this was chosen purely for geometric reasons as write beam angles changes efficiency of the grating changes, 30 deg was the largest angle we could use with acceptable efficiency, the optimum is somewhere between 7.5 and 15 deg.
Central Wavelength: 530 nm—this choice is dependant upon the particular application Second Filter Element 24
Write configuration: reflection—allows narrowest bandpass possible
Material type: a photo-reactive polymer, sandwiched between indexed matched glass 'windows'
Material thickness: 8 mm—bandpass decreases with increased thickness, but machining the material gets more difficult as well, this was the thinnest material that would meet specifications
Angle between write beams: 15 degrees—chosen to keep efficiency high, and permit the most freedom in geometry
Central wavelength: 530 nm Holographic filter elements of the type disclosed herein may be procured from LPT, Inc., 1576 Sweet Home Rd., Amherst, N.Y. 14228.

FIG. 2 is a functional diagram showing a method of coarse tuning filter 20, and FIG. 3 is a functional diagram showing a method of fine tuning filter 20. Coarse tuning of filter 20 is accomplished by angularly positioning (rotating) first filter element 22 (refer to FIG. 2), and fine tuning is accomplished by angularly positioning second filter element 24 over the wavelength band accepted by first filter element 22 (refer to FIG. 3). The process of tuning the filter elements will change not only the wavelength that is output, but also the angle at which it is transmitted or reflected. Therefore, when first filter element 22 is tuned, second filter element 24 will then need to be tuned as well, to get it back within the range of the transmission of first filter element 22. First element 22 may be tunable over a range about ten times its bandwidth in the initial configuration, i.e. a 2 nm bandpass filter may be tunable over 20 nm. This relationship is an approximation, not a hard and fast rule.

First filter element 22 can accept a wavelength band of several nanometers, while second filter element 24 accepts a wavelength band of 0.05 nm (0.5 Å) which can be chosen from anywhere within the wavelength band of first filter element 22. In an embodiment of the invention, first filter element 22 accepts wavelengths from 529-531 nm, and second filter element 24 has a 0.05 nm bandpass. Therefore, by tuning second filter element 24 the filter can be set to accept 529-529.05 nm, or 529.5-529.55 nm, or 530.4-530.45 nm, or 530.6-530.65 nm, or any other 0.05 nm band within the wavelength band of first filter element 22.

Depending on the angle of acceptance desired for first filter element 22, its bandpass may be 100 times or more that of second filter element 24. The second filter element 24 may be tuned to accept a narrow region anywhere within the bandpass of first filter element 22, without tuning first filter element 22. Both filter elements may be tuned in angle to adjust the broad spectral bandpass of first filter element 22 over the range accepted by the material the holographic grating is written in, and tuning second filter element 24 in angle to select a narrow spectral bandpass within the broad range of first filter element 22.

In either coarse or fine tuning, if it is desirable to keep the out coming light 28 in the exact same position while tuning, mirror 30 would need to be tuned as well. This requirement is due to the aforementioned property that tuning changes both wavelength and angle.

A method of tuning filter 20 includes:
1. Position first filter element 22 (in angle) to accept the desired wavelength.
    As an example, at 532 nm central acceptance wavelength first filter element 22 is positioned normal to incident light, and then has an acceptance of around 531-533 nm.
2. Position second filter element 24 (in angle) to accept the central wavelength passed by first filter element 22.
    At 532 nm central acceptance wavelength second filter element 24 is positioned either normal to incident light, or turned 15 degrees away from the normal, and then has an acceptance of 0.05 nm centered at 532 nm.
3. To change the central wavelength of second filter element 24 to be any value within the accepted range of first filter element 22 (fine tuning), change the angular position of second filter element 24 relative to the incident light. A different wavelength band will be passed as dictated by the Bragg condition.
    To tune second filter element 24 between 531 and 533 nm the angular position needs to be changed about 4 degrees total to cover the entire range. There is not a constant value (in degrees per nm) to describe this type of tuning because the interdependence of wavelength and angle is a relationship with the sine of the angle. In this small tuning region the amount of required tuning ranges from 1.5-2.5 degrees/nm, in an embodiment of the invention.
4. To achieve coarse tuning, first filter element 22 can be repositioned in angle relative to the incident light. This will then change its central wavelength acceptance, and the wavelength band accepted will be of the same width. The tuning, in the described embodiment of this invention, is about 1 degree per nm. The full allowed range of tuning depends on the type of material used and what the requirements for efficiency are (far enough away from the design wavelength, the filter performance starts to drop off).
5. After coarse tuning, second filter element 24 is then repositioned to accept light within the band passed by filter element 22, and fine tuning within the new range can be performed as before.

Through use of micro-positioning equipment and a software program containing the tuning calibration, the tuning process can be fully automated and performed rapidly in the field while interrogation is being done.

Figure 4:
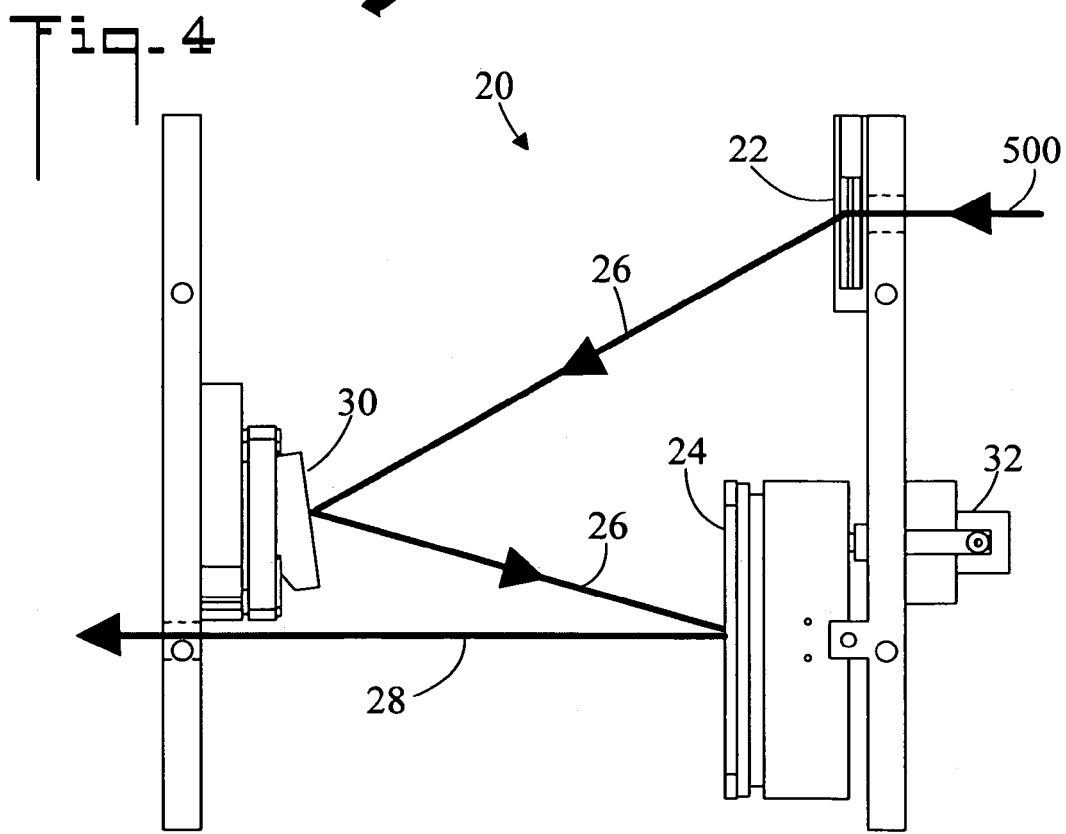
FIG. 4 is a mechanical implementation of the filter.

FIG. 4 is a mechanical implementation of filter 20. It is noted that in this embodiment mirror 30 is placed between first filter element 22 and second filter element 24. Also, a motor 32 is used to angularly tune second filter element 24.

The preferred embodiments of the invention described herein are exemplary and numerous modifications, variations, and rearrangements can be readily envisioned to achieve an equivalent result, all of which are intended to be embraced within the scope of the appended claims.

We claim:

1. A wavelength tunable holographic filter for incoming light having different angles of incidence, said filter comprising:
   a first filter element having a broad acceptance angle;
   a second filter element having narrow spectral bandwidth;
   wherein the light having different angles of incidence is collimated by said first filter element and directed at said second filter element which only passes light having a narrow spectral bandwidth; and,
   wherein coarse tuning of said wavelength tunable holographic filter is accomplished by angularly positioning said first filter element.

2. A wavelength tunable holographic filter for incoming light having different angles of incidence, said filter comprising:
   a first filter element having a broad acceptance angle;
   a second filter element having narrow spectral bandwidth;
   wherein the light having different angles of incidence is collimated by said first filter element and directed at said second filter element which only passes light having a narrow spectral bandwidth; and,
   wherein fine tuning of said wavelength tunable holographic filter is accomplished by angularly positioning said second filter element over the wavelength band accepted by said first filter element.

3. A wavelength tunable holographic filter for incoming light having different angles of incidence, said filter comprising:
   a first filter element having a broad acceptance angle;
   a second filter element having narrow spectral bandwidth;
   wherein the light having different angles of incidence is collimated by said first filter element and directed at said second filter element which only passes light having a narrow spectral bandwidth;
   said first filter element being a transmission filter element;
   said first filter element having an angle between write beams of between about 7.5 degrees and about 30 degrees;
   said first filter element having a thickness of between about 0.75 mm and about 2 mm;
   said second filter element being a reflection filter element;
   said second filter element having an angle between write beams of between about 7.5 degrees and about 15 degrees;
   said second filter element having a thickness of between about 5 mm and about 12 mm;
   wherein fine tuning of said wavelength tunable holographic filter is accomplished by angularly positioning said second filter element over the wavelength band accepted by said first filter element; and,
   wherein coarse tuning of said wavelength tunable holographic filter is accomplished by angularly positioning said first filter element.

4. Method for tuning a wavelength tunable holographic filter, comprising:
   (a) providing a light source having different angles of incidence;
   (b) providing a wave length tunable holographic filter, including:
      a first filter element having a broad acceptance angle;
      a second filter element having narrow spectral bandwidth, wherein light from said first filter element is directed at said second filter element;
   (c) directing light from said light source at said first filter element, wherein said light is collimated by said first filter element;
   (d) angularly positioning said first filter element to accept a desired central acceptance wavelength having a wavelength band; and,
   (e) angularly positioning said second filter element to accept a wavelength within said wavelength band.

5. The method of claim 4, further including:
   (f) effecting coarse tuning of said wavelength tunable holographic filter by angularly positioning said first filter element to accept a different central acceptance wavelength and wavelength band from that of step (d); and,
   repeating step (e).

* * * * *